US008740137B2

(12) United States Patent
Vauchel et al.

(10) Patent No.: US 8,740,137 B2
(45) Date of Patent: Jun. 3, 2014

(54) REMOVABLE AIR INTAKE STRUCTURE FOR A TURBOFAN ENGINE NACELLE

(75) Inventors: Guy Bernard Vauchel, Le Havre (FR); Serge Epherre-Iriart, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1033 days.

(21) Appl. No.: 12/443,913

(22) PCT Filed: Oct. 2, 2007

(86) PCT No.: PCT/FR2007/001605
§ 371 (c)(1),
(2), (4) Date: Aug. 19, 2009

(87) PCT Pub. No.: WO2008/040877
PCT Pub. Date: Apr. 10, 2008

(65) Prior Publication Data
US 2010/0084507 A1 Apr. 8, 2010

(30) Foreign Application Priority Data
Oct. 2, 2006 (FR) ...................................... 06 08599

(51) Int. Cl.
*B64D 29/06* (2006.01)
*B64D 29/08* (2006.01)
(52) U.S. Cl.
USPC .............................. 244/54; 244/53 B; 60/798
(58) Field of Classification Search
USPC ................ 244/53 R, 54, 53 B, 134 R, 134 D; 60/226.1, 796, 797, 798
See application file for complete search history.

(56) References Cited

U.S. PATENT DOCUMENTS

| 3,763,874 | A | * | 10/1973 | Wilde et al. | 137/15.1 |
| 5,014,933 | A | | 5/1991 | Harm et al. | |
| 5,609,313 | A | * | 3/1997 | Cole et al. | 244/54 |
| 5,941,061 | A | * | 8/1999 | Sherry et al. | 60/798 |
| 6,179,249 | B1 | * | 1/2001 | Canadas | 244/53 R |
| 6,227,485 | B1 | * | 5/2001 | Porte | 244/54 |
| 6,340,135 | B1 | * | 1/2002 | Barton | 244/53 B |
| 6,443,395 | B1 | * | 9/2002 | Porte et al. | 244/134 R |
| 6,837,459 | B2 | * | 1/2005 | Gonidec et al. | 244/53 B |
| 7,469,862 | B2 | * | 12/2008 | Layland et al. | 244/134 D |
| 7,513,458 | B2 | * | 4/2009 | Layland et al. | 244/134 D |
| 7,588,212 | B2 | * | 9/2009 | Moe et al. | 244/134 D |

(Continued)

FOREIGN PATENT DOCUMENTS

| GB | 2 274 490 | 7/1994 |
| GB | 2 288 578 | 10/1995 |

OTHER PUBLICATIONS

International Search Report; PCT/FR2007/001605; Feb. 18, 2008.

*Primary Examiner* — Joseph W Sanderson
(74) *Attorney, Agent, or Firm* — Brinks Gilson & Lione

(57) ABSTRACT

A nacelle for a turban engine includes an air intake structure and a central structure. The central structure has a casing intended to surround a fan and an external structure. The air intake structure has at least one internal panel attached to the central structure via the casing and therewith forming a fixed structure and at least one longitudinal external panel attached removably to the fixed structure and incorporating an air intake lip. The external panel is moveable between an operating position and a maintenance position in which the external panel is separated from the external structure of the central section and the air intake lip is separated from the internal panel of the air intake structure.

20 Claims, 17 Drawing Sheets

(56) References Cited

U.S. PATENT DOCUMENTS

| | | | |
|---|---|---|---|
| 2002/0027180 A1* | 3/2002 | Porte et al. | 244/134 R |
| 2005/0001458 A1 | 1/2005 | Yamada | |
| 2006/0237582 A1* | 10/2006 | Layland et al. | 244/53 R |
| 2006/0237590 A1* | 10/2006 | Layland et al. | 244/134 R |
| 2010/0084507 A1* | 4/2010 | Vauchel et al. | 244/1 N |
| 2010/0252689 A1* | 10/2010 | Vauchel et al. | 244/53 B |
| 2010/0314501 A1* | 12/2010 | Vauchel et al. | 244/53 B |
| 2011/0219783 A1* | 9/2011 | Joret et al. | 60/796 |

* cited by examiner

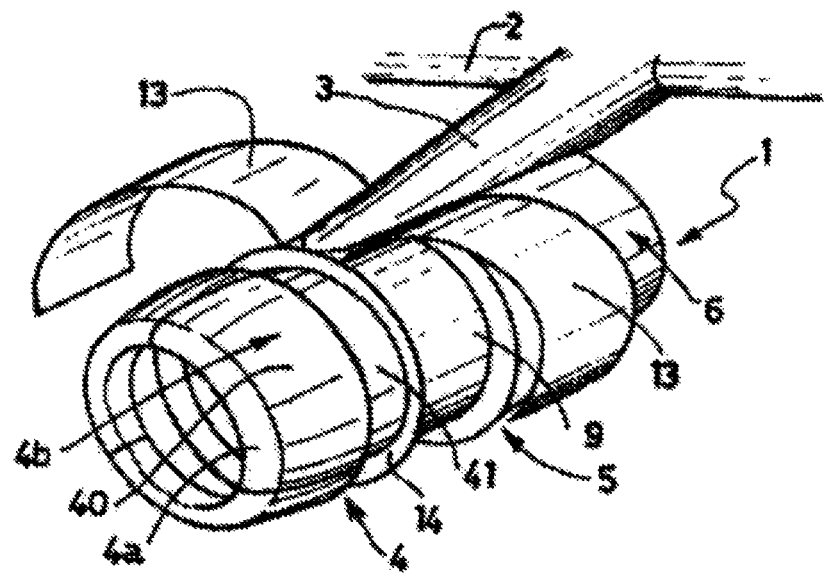
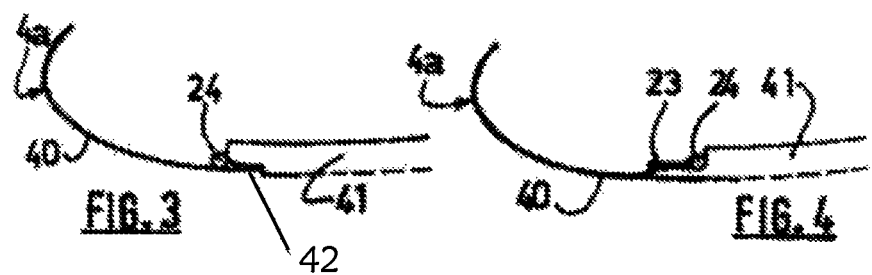

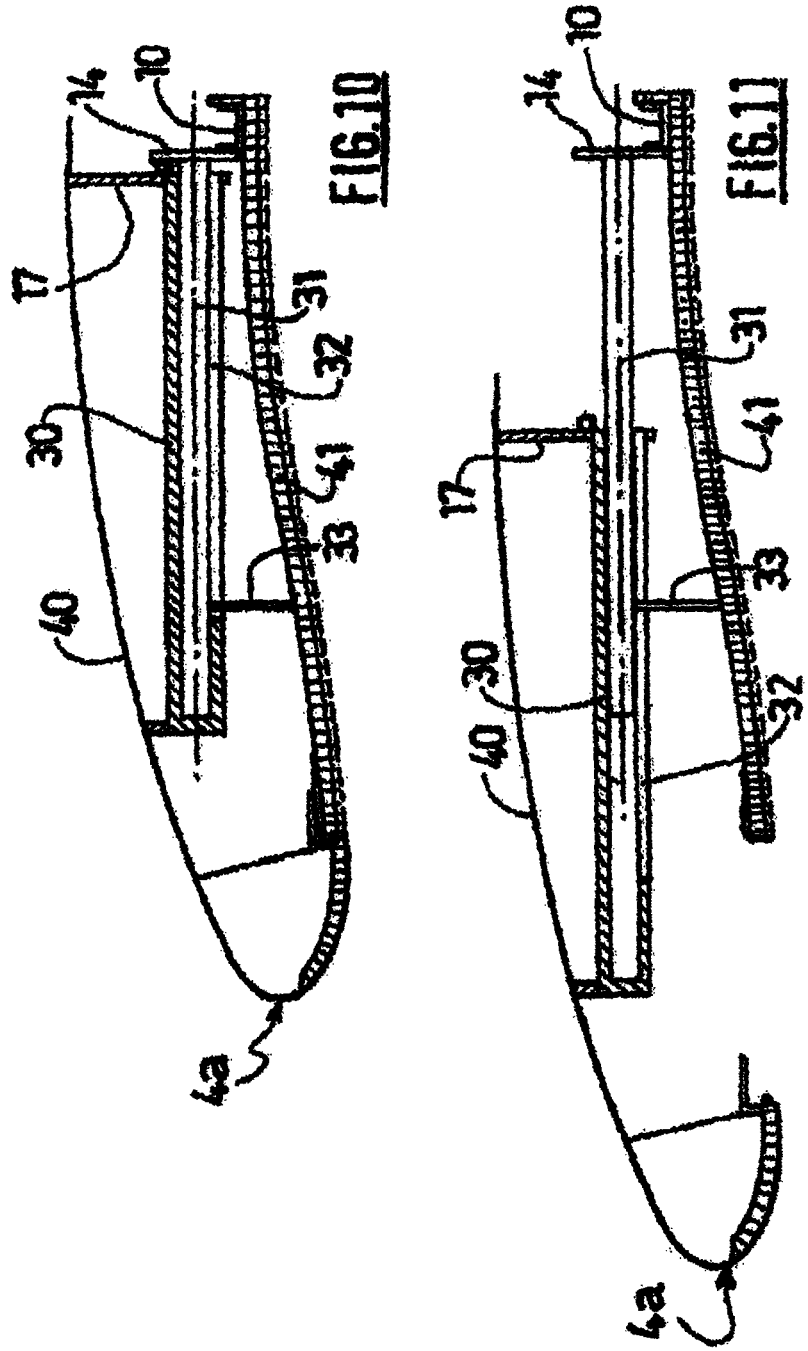

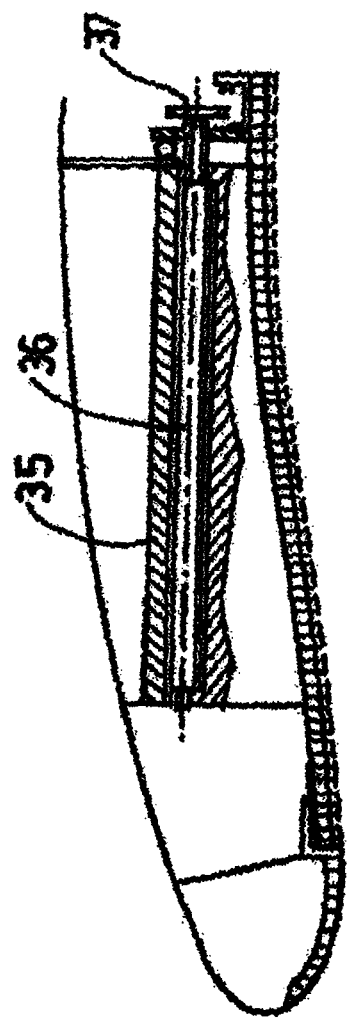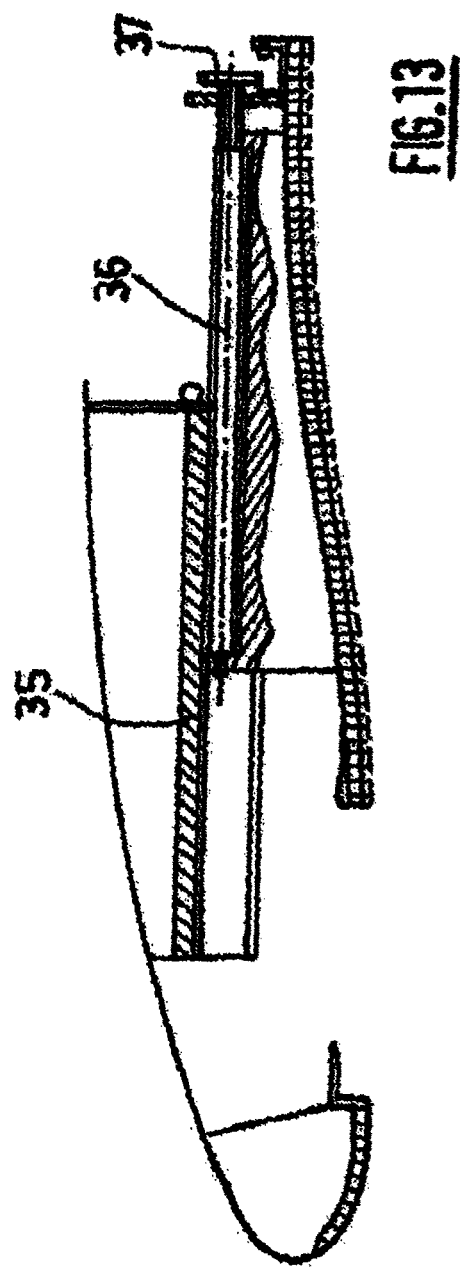

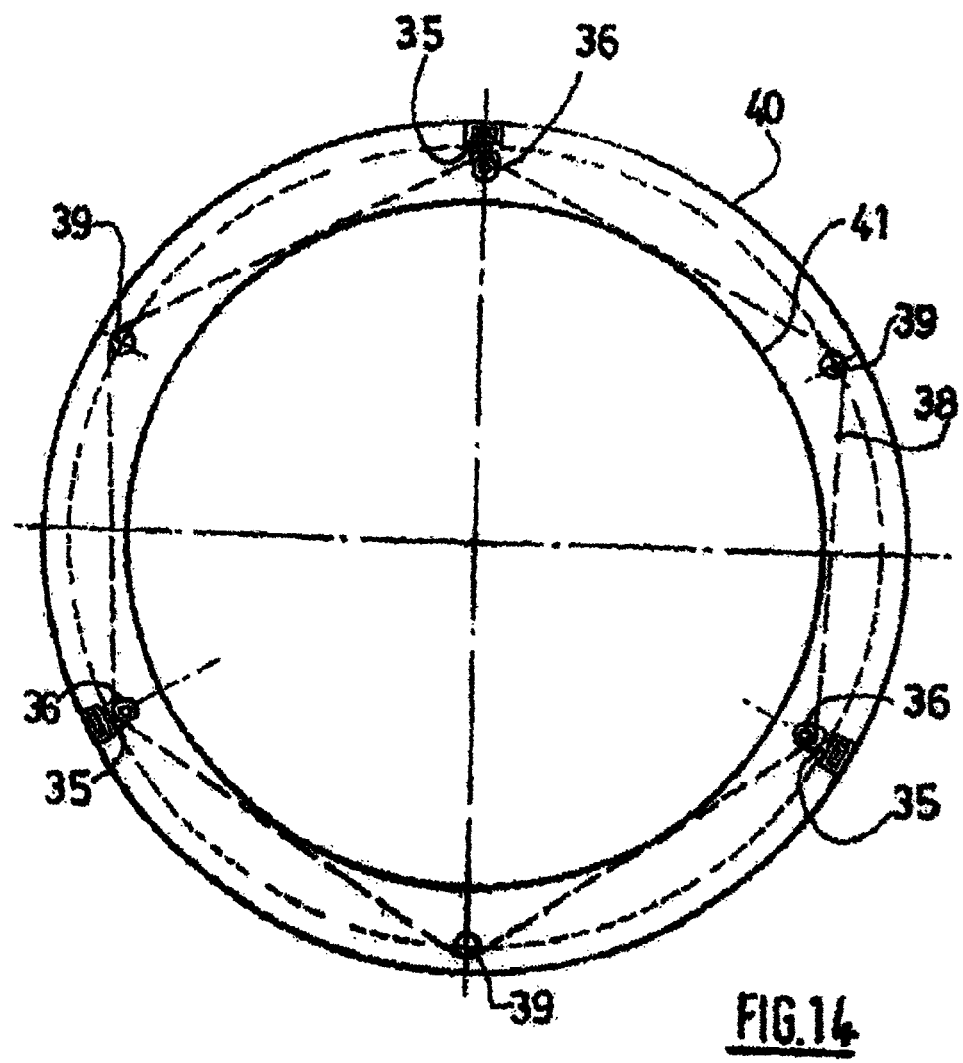

REMOVABLE AIR INTAKE STRUCTURE FOR A TURBOFAN ENGINE NACELLE

TECHNICAL FIELD OF THE INVENTION

The present invention relates to a nacelle for a turbojet comprising an air intake structure capable of channeling an air flow toward a fan of the turbojet and a middle structure designed to surround said fan and to which the air intake structure is attached.

BRIEF SUMMARY OF RELATED ART

An aircraft is propelled by one or more propulsive assemblies comprising a turbojet housed in a tubular nacelle. Each propulsive assembly is attached to the aircraft by a pylon usually situated beneath a wing or on the fuselage.

A nacelle usually has a structure comprising an air intake upstream of the engine, a middle section designed to surround a fan of the turbojet, a downstream section housing thrust reverser means and designed to surround the combustion chamber of the turbojet, and is usually terminated by an exhaust nozzle the outlet of which is situated downstream of the turbojet.

The air intake comprises, on the one hand, an intake lip suitable for making it possible to optimally gather toward the turbojet the air necessary for supplying the fan and the compressors inside the turbojet, and, on the other hand, a downstream structure to which the lip is fitted and which is designed to properly channel the air toward the fan blades. The assembly is attached upstream of a casing of the fan belonging to the middle section of the nacelle.

According to the temperature and relative humidity conditions on the ground or in flight, ice may be deposited on the profile of the lip, notably on the inner profile. This formation of ice may be dangerous for the mechanical operation of the fixed and rotating portions of the engine and cause a reduction of performance. Systems for deicing this portion of the air intake lip have therefore been produced to remedy this problem. It is possible in particular to cite documents U.S. Pat. No. 4,688,757 and EP 1 495 963 and the as yet unpublished application registered under number FR 06/02547.

Currently, the maintenance operations on this equipment housed inside the air intake structure oblige the manufacturers to provide hatches for access to these various items of equipment. Despite the efforts made to optimize the positioning of the hatches and allow the easiest possible access, it is sometimes necessary to visit the internal equipment of the air intake structure with the aid of specific tools such as an endoscope, which is not entirely satisfactory with respect to the inspection of this equipment.

Furthermore, if it is necessary to replace a portion of the internal equipment, it is necessary to remove the whole of the air intake structure which requires considerable toolage and involves an immobilization of the propulsive assembly and therefore usually the aircraft.

It will also be noted that the operating and maintenance conditions of an air intake make it necessary to have distinct components, such as a sectorized modular lip and an outer panel that can be easily removed because of their high replacement rate due to their direct exposure to the external environment and to possible projectiles. These constraints considerably reduce the integrity of the general aerodynamic line of the air intake structure which the presence of access hatches further aggravates.

BRIEF SUMMARY OF THE INVENTION

The invention remedies the abovementioned disadvantages and for this reason consists in a nacelle for a turbojet comprising an air intake structure capable of channeling an air flow toward a fan of the turbojet and a middle structure designed to surround said fan and to which the air intake structure is attached so as to provide an aerodynamic continuity, the middle structure comprising, on the one hand, a casing designed to surround the fan and, on the other hand, an outer structure, characterized in that the air intake structure comprises, on the one hand, at least one inner panel attached to the middle structure and forming with the latter a fixed structure of the nacelle, and, on the other hand, at least one outer longitudinal panel attached in a removable manner to the fixed structure and incorporating an air intake lip, said outer panel being removable between an operating position in which the outer panel provides the aerodynamic continuity with the outer structure of the middle section and the air intake lip provides the aerodynamic continuity with the inner panel of the air intake structure, and a maintenance position in which the outer panel is separated from the outer structure of the middle section and the air intake lip is separated from the inner panel of the air intake structure.

Therefore, by incorporating the air intake lip into the outer panel so as to form a single removable part, a removal and partial replacement of the air intake structure are made possible and easier. Furthermore, removal made easier in this way also makes it possible to open the air intake structure in order to gain access to internal equipment without requiring considerable and complicated maneuvers nor requiring a long immobilization time. It should also be noted that there is then no longer a connection interface between the outer panel and the air intake lip, since only one possible longitudinal interface may exist in the case of a plurality of panels. This absence of interface perpendicular to an air flow makes it possible to improve the outer aerodynamic line of the nacelle.

It should also be noted that the present invention limits the size of the translatable outer panel substantially at the junction between the inner wall of the air intake and the fan casing. Therefore, the fan casing can still be fitted with its own access means.

Therefore, if maintenance is necessary only on the casing of the fan or on its junction with the inner wall of the air intake, it is not necessary to needlessly remove the outer wall of the air intake. The result of this is an overall maintenance time-saving, each section retaining an option of independent access.

Advantageously, the middle structure has, with the outer panel, an interface situated downstream of the air intake structure. More precisely, the nacelle has an outer panel extending slightly beyond the junction between the fan casing and the inner panel.

In this manner, the impact of the aerodynamic break that said interface forms on aerodynamic performance is minimized.

Preferably, the middle section comprises at least one movable cover capable of allowing external access to the nacelle.

Advantageously, the lip and the outer panel of the air intake structure have an interface at which said lip and outer panel overlap partially when in the closed position. Also advantageously, the interface has an upstream point forming an abutment. Such an overlap will advantageously make it possible to fit the portion of the inner wall overlapping the lip with means for deicing the bottom zone of said lip.

Advantageously, the outer panel of the air intake structure has a rear frame capable of being attached to a matching partition of the air intake structure secured to a fixed portion of the nacelle by means of the inner panel.

Advantageously, the air intake structure comprises means for centering and positioning the outer panel.

Preferably, the air intake structure comprises guidance means capable of allowing a substantially rectilinear movement of the outer panel toward the upstream of the nacelle so as to be able to open the outer panel. Therefore, it is easier to partially open the air intake structure and replace said structure.

Advantageously, the air intake structure comprises at least one abutment means of the outer panel capable of allowing a partial opening of the latter without requiring complete removal.

Preferably, the guidance means comprise at least one rail system.

Advantageously, the guidance means comprise at least one rail capable of interacting with a corresponding slide or a runner.

As a variant or additionally, the guidance means comprise at least one system of roller skids capable of interacting with a corresponding rail. Advantageously, the rollers are mounted on flexible axles of the PAULSTRA® type. Again advantageously, the rollers are mounted on at least one plate, said plate itself being attached in a flexible manner, via a swivel-joint connection or an interface of the PAULSTRA® type, for example.

As a variant or additionally also, the guidance means comprise at least one channel-like rail capable of interacting with a corresponding slide system.

Advantageously, the guidance means comprise at least one longitudinal shaft capable of sliding through a corresponding opening. Such shafts also perform a centering function.

Preferably, the air intake structure comprises mechanical or manual means for moving the outer panel along the guidance means.

Again preferably, the inner panel of the air intake structure comprises an acoustic shroud.

Advantageously, the air intake structure comprises electric equipment for deicing the air intake structure.

Advantageously, the inner panel or the outer panel is, at the junction between the air intake lip, extended by a peripheral elastic tongue capable of covering said junction when the outer panel is in the closed position.

It should also be noted that the pylon by which the nacelle is attached to the aircraft extends over the downstream and middle section of the nacelle and does not usually protrude over the air intake section. Because of this, the means for guiding the movable cover cannot use the pylon as a point of attachment for the rails, and it is necessary to incorporate a distinct guidance system into the air intake.

BRIEF DESCRIPTION OF THE DRAWINGS

The application of the invention will be better understood with the aid of the detailed description that is given below with respect to the appended drawing in which:

FIG. 1 is a schematic representation of a nacelle according to the invention showing an air intake structure comprising a lip incorporated into the outer panels.

FIGS. 3 to 5 are enlarged schematic representations of the zone of junction between an outer panel incorporating an air intake lip and an inner panel of the air intake structure of FIG. 2.

FIGS. 10 and 11 are partial schematic representations of a first variant embodiment of the guidance means fitted to the air intake structure according to the invention respectively in the closed and open position.

FIGS. 12 and 13 are partial schematic representations of a second variant embodiment of guidance means fitted to the air intake structure according to the invention respectively in the closed and open position, said guidance means comprising movement means.

FIG. 14 is a front view in section of the guidance system shown in FIGS. 12 and 13.

DETAILED DESCRIPTION OF THE INVENTION

Figure 2:
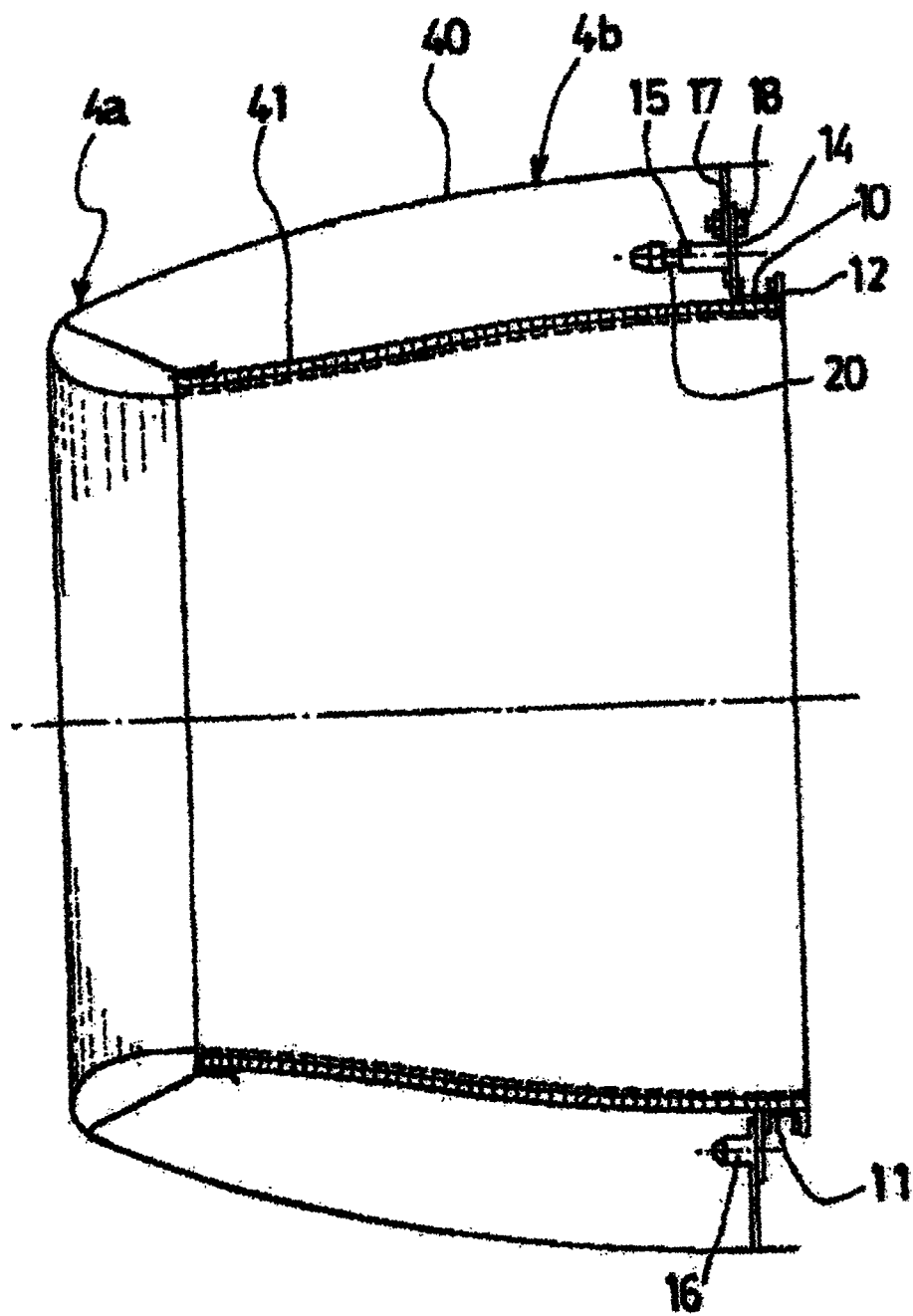
FIG. 2 is a schematic representation in longitudinal section of a first embodiment of the air intake structure of FIG. 1.

A nacelle 1 according to the invention as represented in FIG. 1 is a tubular housing for a turbojet (not visible) for which it serves to channel the air flows that it generates while defining inner and outer aerodynamic lines necessary to obtain optimal performance. It also houses various components necessary to the operation of the turbojet and ancillary systems such as a thrust reverser.

The nacelle 1 is designed to be attached to a fixed structure of an aircraft, such as a wing 2, by means of a pylon 3.

More precisely, the nacelle 1 has a structure comprising a front section forming an air intake 4, a middle section 5 surrounding a fan (not visible) of the turbojet, and a rear section 6 surrounding the turbojet and usually housing a thrust reverser system (not shown).

The air intake 4 is divided into two zones, namely on the one hand an intake lip 4a suitable for allowing for optimally gathering to the turbojet the air necessary to supply the fan and internal compressors of the turbojet, and on the other hand a downstream structure 4b comprising an outer panel 40 and an inner panel 41 and to which the lip 4a is fitted and designed to appropriately channel the air toward the blades 8 of the fan 6.

According to the invention, the lip 4a is incorporated into the outer panel 40 so as to form a single removable part, the inner panel 41 being attached upstream of a casing 9 of the fan belonging to the middle section 5 of the nacelle 1 by means of attachment flanges 10, 11, respectively secured to the downstream structure 4b and of the casing 9 and forming a junction 12.

The air intake structure 4 may be modular and comprise a plurality of outer panels 40 each defining a corresponding portion of air intake lip 4a. In this case, the air intake structure 4 will have junction lines. However, these lines extend longitudinally relative to the nacelle 1 and they will have only a negligible impact on the aerodynamic continuity of the air intake structure 4 unlike a nacelle according to the prior art having a peripheral junction line between the outer panel 40 and the lip 4a, said junction line being situated transversely relative to the direction of flow of the air.

FIG. 1 shows the air intake structure 4 with the outer panel 40 in the partially open position. Advantageously, said outer panel can be opened only after lateral fan covers 13 fitted to the middle section are opened.

FIG. 2 shows a first embodiment of an air intake structure 4 according to the invention.

First of all, the inner panel 41 is made from an acoustic shroud and is connected by means of flanges 10, 11 to the casing 9 of the middle section 5. This inner panel 41 therefore forms a fixed portion of the air intake structure 4 to which the outer panel 40 incorporating the air intake lip 4a is designed to be fitted and attached in a removable manner.

To do this, each flange 10, 11 also supports a radial peripheral partition 14, this partition supporting centering elements 15 and secondary centering elements 16 extending perpendicularly to said partition 14 in the upstream direction of the nacelle 1. Preferably, three centering elements 15 and three secondary centering elements 16 will be provided uniformly distributed alternately around the air intake structure 4.

It will also be noted that the air intake structure 4 may extend axially by means of its outer panel 41 beyond a flange for attaching the inner panel 41 to the fixed structure of the nacelle 1 in order to come close to an outer structure of a thrust reverser structure belonging to the downstream section 6 of the nacelle 1 and if necessary to cover the covers 13. A system of latches may then be provided to keep the air intake structure on the partition 14 secured to the structure of the casing 9 or to an upstream structure of the downstream structure 6.

It will also be noted that the radial peripheral partition 14 may be supported directly by the very structure of the fan casing 9 in order to provide a maximum inner covering for the air intake 4.

The outer panel 40 incorporating the air intake lip 4a therefore forms, according to the invention, a removable portion designed to be fitted to the fixed portion and more particularly to the peripheral partition 14.

To do this, the outer panel 40 is fitted with a peripheral front frame 17 capable of being attached against the partition 14 with the aid of fastening elements 18 such as a bolt/nut system. The front frame also has openings 19 capable of allowing the centering elements 15 and secondary centering elements 16 to pass through when the outer panel 40 is correctly positioned and in the closed position.

Internal reinforcements of the existing inner and outer panels are not shown and depend on the rigidity that is sought by those skilled in the art.

The centering elements 15 are terminated by a groove 20 serving as an element for the retention and support of the outer panel 40 during a removal phase allowing the front frame 17 to couple with it and not tilt. These centering elements 15 and secondary centering elements 16 also fulfill a guidance function and their length depends on the desired guidance.

Sealing of the attachment between the front frame 17 of the outer panel 40 and the partition 14 may be provided with the aid of a peripheral seal.

In the position thus assembled, the lip 4a incorporated into the outer panel 40 provides the aerodynamic continuity with the acoustic shroud 41. Various alignment systems are shown as examples in FIGS. 3 to 5.

The interface between the air intake lip 4a incorporated into the outer panel 40 and the acoustic shroud 41 of the inner panel may itself be external (FIGS. 3 and 4) or internal (FIG. 5) but must provide the purest possible aerodynamic continuity. Rigid centering means, such as centering pins 21 (FIG. 5) capable of interacting with corresponding bores 22, or flexible centering means, such as an elastic tongue 23 (FIG. 4) provide this structural continuity.

A seal 24 is placed at the interface on one or other of the inner panel 41 or outer panel 40 without distinction.

Advantageously, as shown in FIGS. 3 and 4, the lip and the outer panel of the air intake structure have an interface at which said lip and outer panel overlap partially when in the closed position. Again advantageously, the interface has an upstream point forming an abutment 42.

In such a case, it is also possible to have a means for deicing a bottom zone of the lip 4a incorporated into the portion of the inner wall 41 overlapping the lip 4a.

These systems must make it possible to provide a minimum clearance between the acoustic shroud 41 and the air intake lip 4a so that this junction creates the smallest possible aerodynamic turbulence. To allow a precise adjustment of this clearance and reduce it to the minimum, it is possible to provide an adjustable attachment interface between the front frame 17 and the partition 14.

Figure 6:
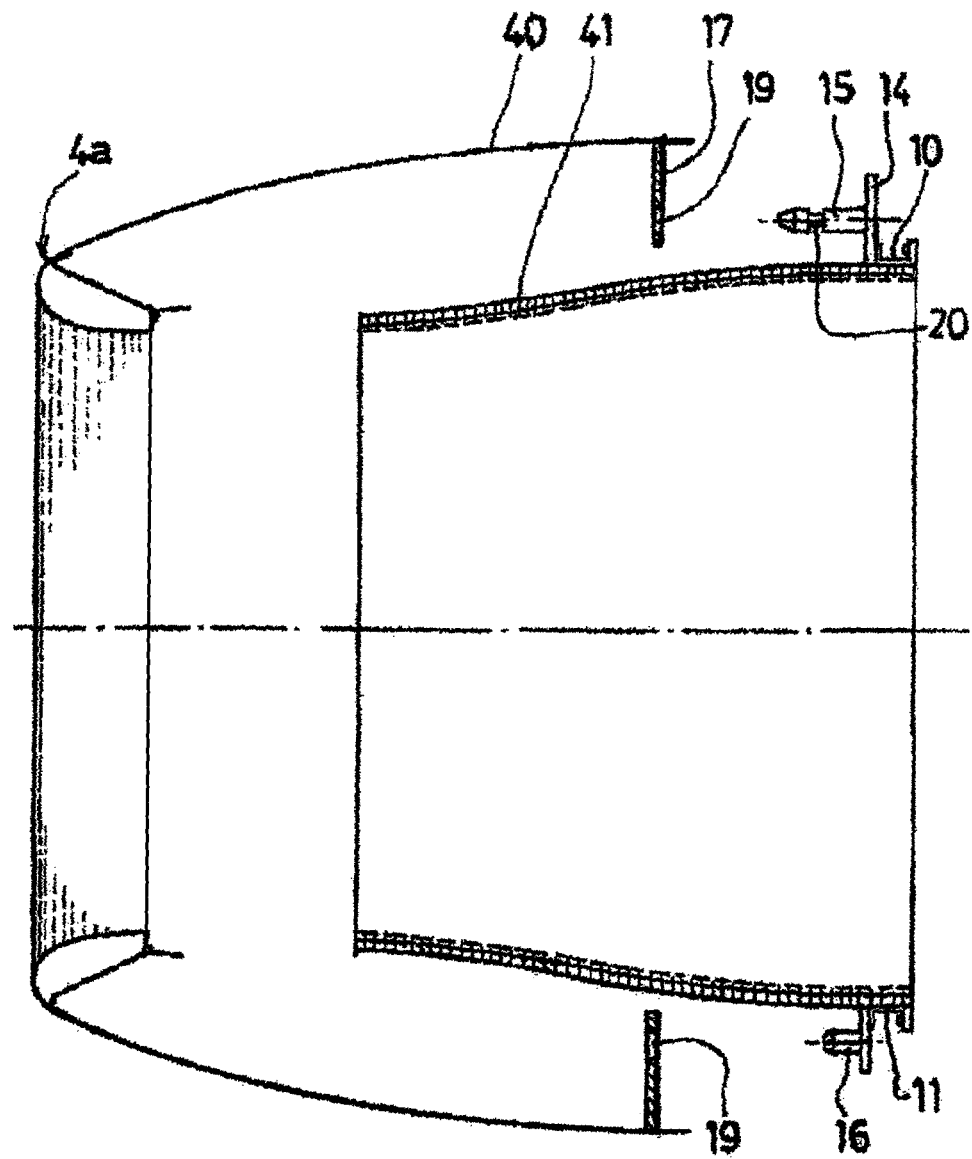
FIG. 6 is a schematic representation in longitudinal section of the air intake structure of FIG. 2 in the open position.

FIG. 6 shows the air intake structure of FIG. 2 in the open position.

Figure 7:
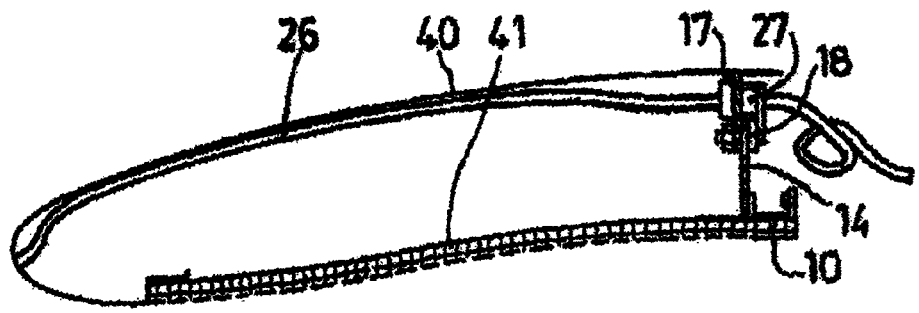
FIGS. 7 to 9 are partial schematic representations of an air intake structure according to the invention showing a connection interface for an electric deicing installation fitted to the outer panel.
Figure 8:
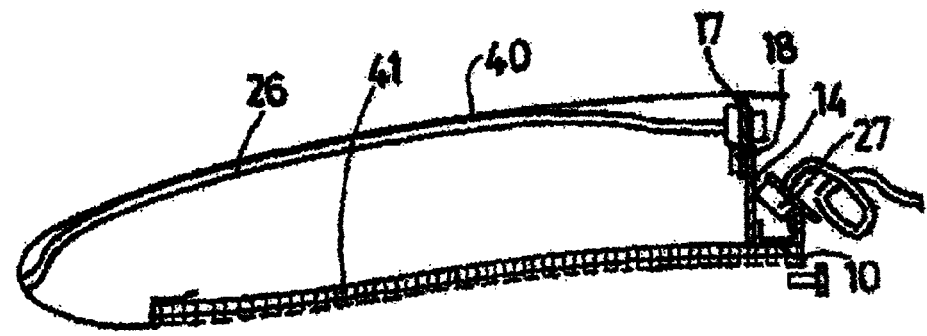
Figure 9:
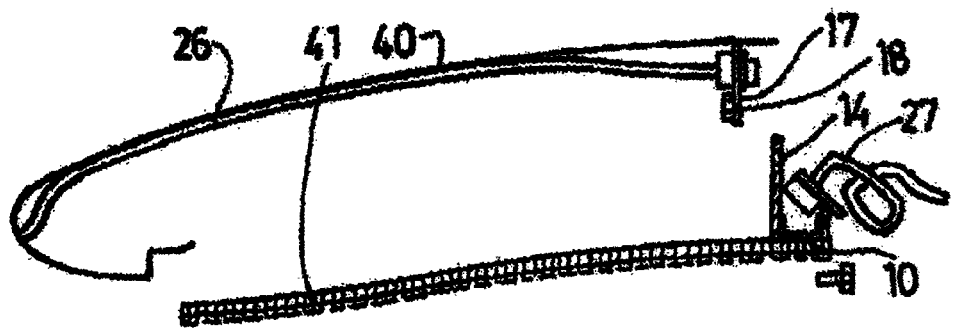

Furthermore, the outer panels 40 and inner panels may comprise electric deicing elements 26 and it will be advantageous to provide an interface for the connection of an electric supply 27 to the front frame or the partition 14. Such a system is shown in FIGS. 7 to 9 at different stages during the removal of the top panel 40.

When there are large air intake dimensions, for example, it is possible to carry out only a partial opening of the outer panel 40 incorporating the air intake lip 4a. It is then useful to provide guidance and optionally actuation means.

A first exemplary embodiment of an air intake structure according to the invention comprising guidance means is shown in FIGS. 10 and 11 showing an outer panel in the closed and open position respectively.

The guidance means comprise a rail 30 secured to the outer panel 40 placed at the interface with the front frame 17 and capable of interacting with a longitudinal shaft 31 supported by the partition 14 and the flange 10 of the fixed portion of the air intake structure 4.

As a structural reinforcement of the shaft 31, a lune 32 is made in the rail to allow a reinforcement 33 of the shaft 31 on the inner panel 41.

Note the possibility of using a telescopic rail/runner system allowing a greater clearance of the outer wall 40.

A second exemplary embodiment of an air intake structure according to the invention comprising guidance means is shown in FIGS. 12 and 13 showing an outer panel 40 in the closed and open position respectively.

In this embodiment, the guidance means include actuation means.

As above, the guidance means comprise a rail 35 secured to the outer panel 40 placed at the interface with the front frame 17, and capable of interacting with a longitudinal shaft 36 supported by the partition 14 and the flange 11 of the fixed portion of the air intake structure 4. However, this rail 35 has the particular feature of having teeth so as to be able to interact with a drive screw serving as a shaft 36. The drive screw 36 is coupled to an electric motor or any other rotary driving means 37 and its actuation makes it possible to open and close the outer panel 40.

Clearly, these two embodiments may be combined to obtain an outer panel 40 capable of sliding either manually or mechanically as the operator wishes.

FIG. 14 is a front view in section of the above embodiment. The guidance method illustrated for the embodiment comprising incorporated driving means is totally transposable with the embodiment comprising simple guidance means for manual operation.

There are three rail 35/shaft 36 guidance systems placed uniformly over the periphery of the air intake structure 4. The systems 37 for rotating each shaft 36 are synchronized by means of a flexible drive cable 38 commonly known as a "flexshaft" capable of delivering the power of an electric motor (not visible) to all the operating systems 37. The flexible drive cable 38 is guided around the air intake structure and reoriented in the direction of each operating system by means of passageway sheaths 39. Clearly, it is possible not to use an electric motor but to provide manual actuation by handle, for example, or else to use more routine transmission means of the belt type or similar type.

Figure 15:
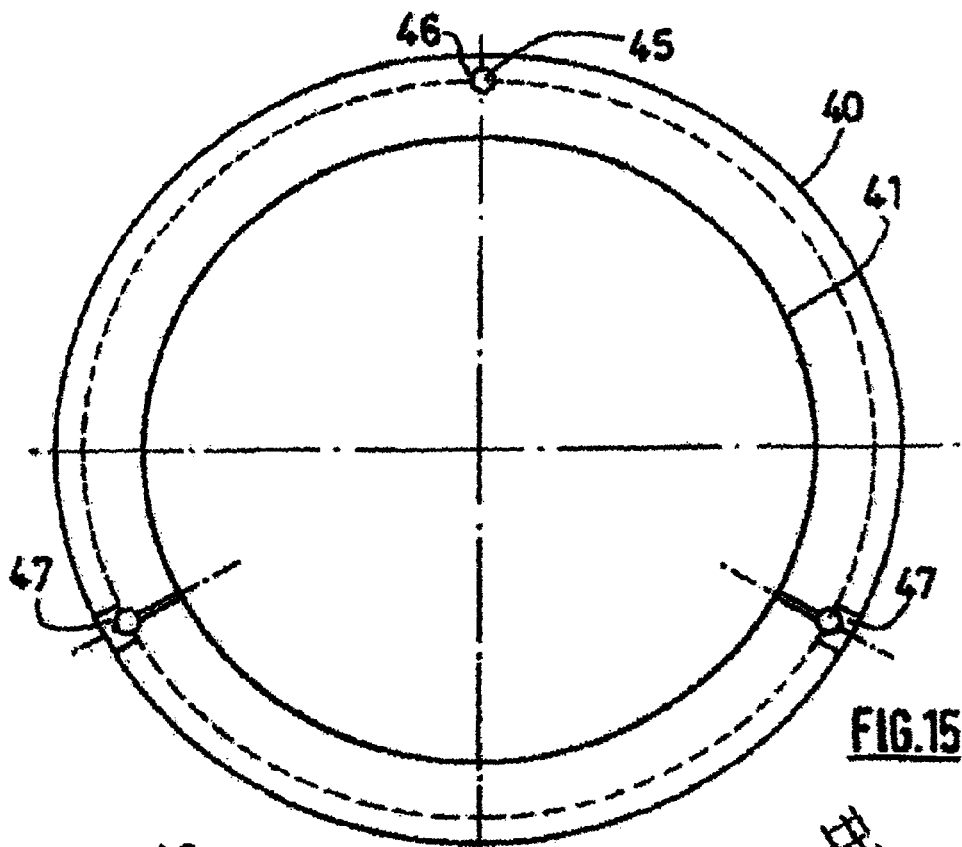
FIG. 15 is a front view in section of a variant embodiment of the guidance system making it possible to reduce the jamming effects.

FIG. 15 shows an exemplary embodiment of the guidance means in order to reduce to the minimum any possible jamming effects that may be encountered in the case of a mechanical operation as described above.

Figure 16:
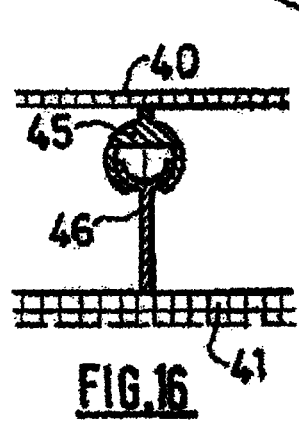
FIGS. 16 to 18 are enlarged partial schematic representations of various elements of the guidance system.

This guidance system comprises a rail 45/slide 46 assembly placed in the upper portion of the air intake structure 4 and a detailed representation thereof is shown in FIG. 16.

Figure 17:
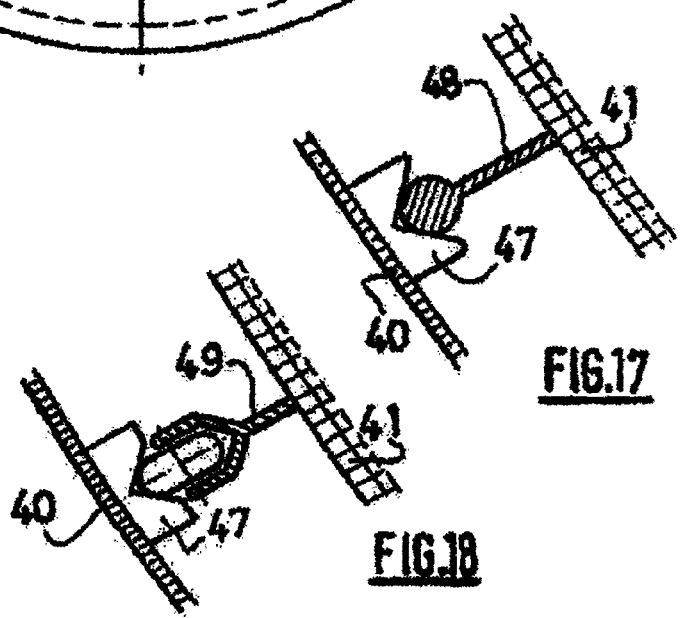
Figure 18:
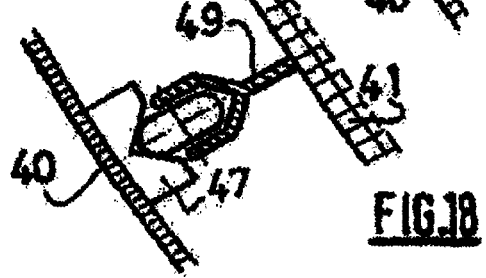

The guidance system comprises two other guidance points placed equidistant from one another around the air intake structure 4 and comprising a channel-like rail 47 in which a corresponding shaft 48 is capable of sliding. The channel-like configuration of these rails 47 makes it possible to obtain a tolerance on a possible misalignment of the air intake structure 4 when it is opened and/or closed. The shaft 48 may be a simple slide as shown in detail in FIG. 17 or a shaft with rollers 49 as shown in FIG. 18, for example.

Figure 19:
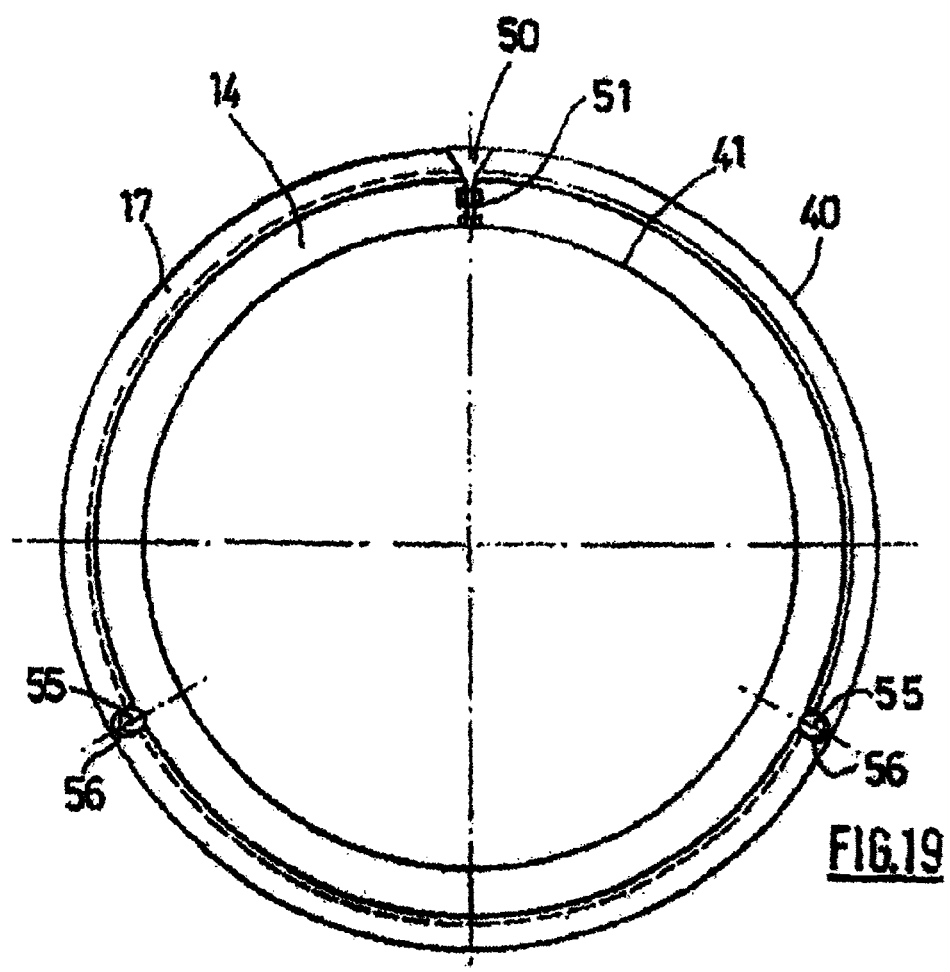
FIG. 19 is a front view in section of a second variant embodiment of the guidance system making it possible to reduce the jamming effects.

FIG. 19 shows a second exemplary embodiment of the guidance means in order to further reduce the jamming effects.

This guidance system comprises a first guidance point comprising a slide 50 which is placed as above in the upper portion of the air intake structure and of which a detailed representation is shown in FIG. 19 and which comprises a skid with rollers fitted with at least two rollers 52 capable of sliding inside a corresponding rail 51. A final abutment 54 is incorporated into the rail 51 at the end of the opening travel.

It is also possible to provide the reverse arrangement, that is to say a guide rail translating inside roller plates placed on either side of the rail. This system will be described below with FIGS. 26 to 29.

The guidance system comprises two other guidance points placed equidistant from one another around the air intake structure and comprising a shaft 55 secured to the partition 14 of the fixed portion of the air intake structure 4 and capable of sliding in an oblong opening 56 arranged in the front frame 17 of the outer panel 40.

It is also possible to add at least one handle connected to the front frame 17 and to an inner surface of the outer panel 40 half way up the air intake structure 4 on each side of the nacelle 1. The handles are positioned at an angle dependent on the height of the nacelle 1 on the aircraft and on its accessibility for an operator on the ground. Each handle may be incorporated into a reinforcing bracket between the front frame 17 and the outer panel 40.

In addition, the outer panel 40 of the air intake structure 1 may be connected to an electric ground the invention of which is developed in document EP 0 983 939 in the name of the applicant.

Figure 22:
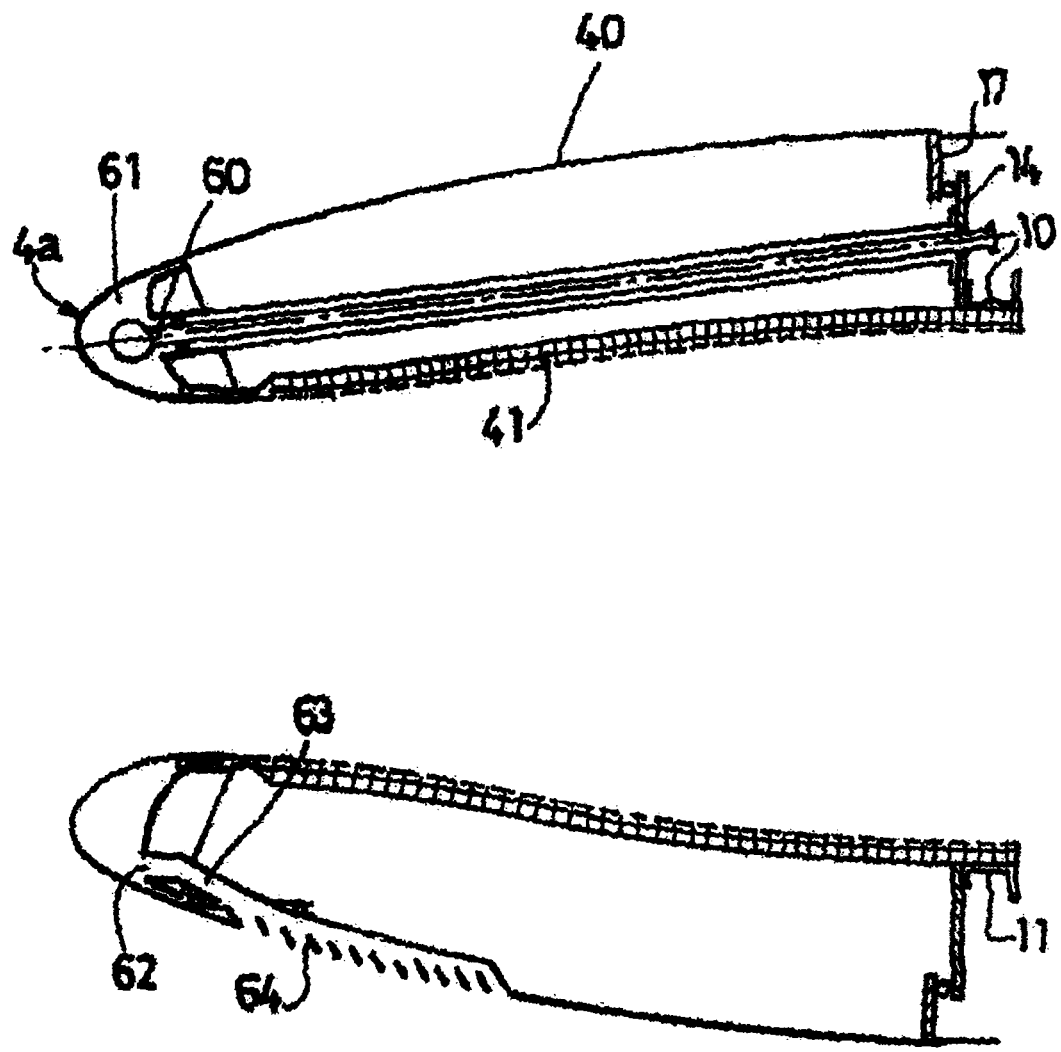
FIGS. 22 and 23 are schematic representations in longitudinal section of an air intake according to the invention comprising pneumatic deicing means.
Figure 23:
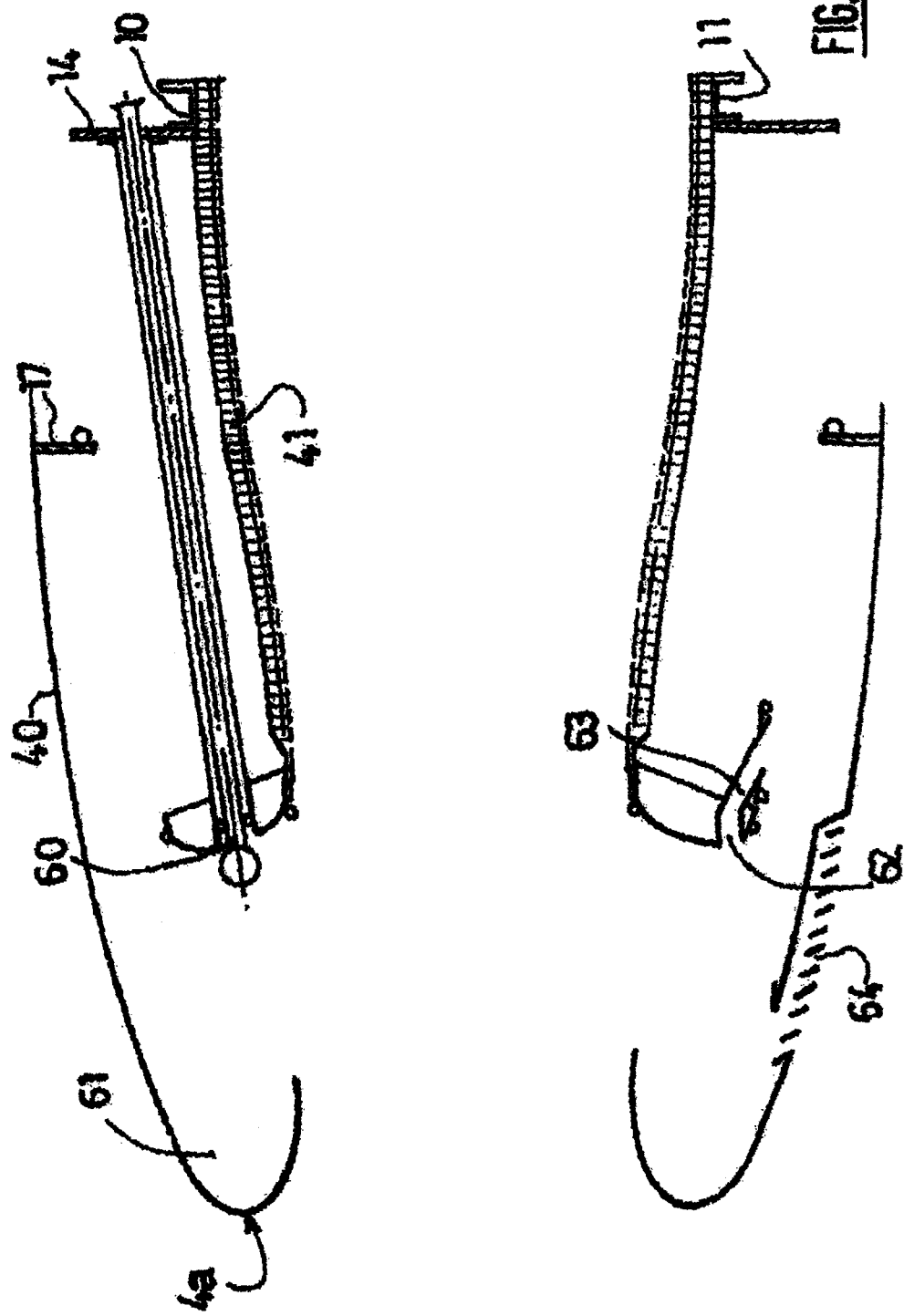

FIGS. 22 and 23 show the application of the invention to an air intake structure 4 comprising a pneumatic deicing system. In this case, the air intake structure 4 comprises a nozzle 60 delivering hot air from the turbojet which passes through the front frame 17 and/or the partition 14 of the fixed portion of the air intake structure 4. The nozzle emerges in an inner sealed and peripheral compartment 61 situated at the air intake lip 4a.

This compartment 61 has an opening 62 at the lower portion of which a discharge channel 63 departs emerging at the outer panel 41 at a grating 64. Clearly, this air discharge function may also emerge at the inner panel 40 as a variant.

As mentioned above, it is possible to provide a mechanical system for driving the movable cover assisted by electric or manual actuation means. A first embodiment has been described and represented in FIGS. 12 and 13. Clearly other embodiments are possible as an alternative or an addition by friction (on an element underneath, for example, of the elastomer on elastomer type) or a mechanical embodiment.

Figure 24:
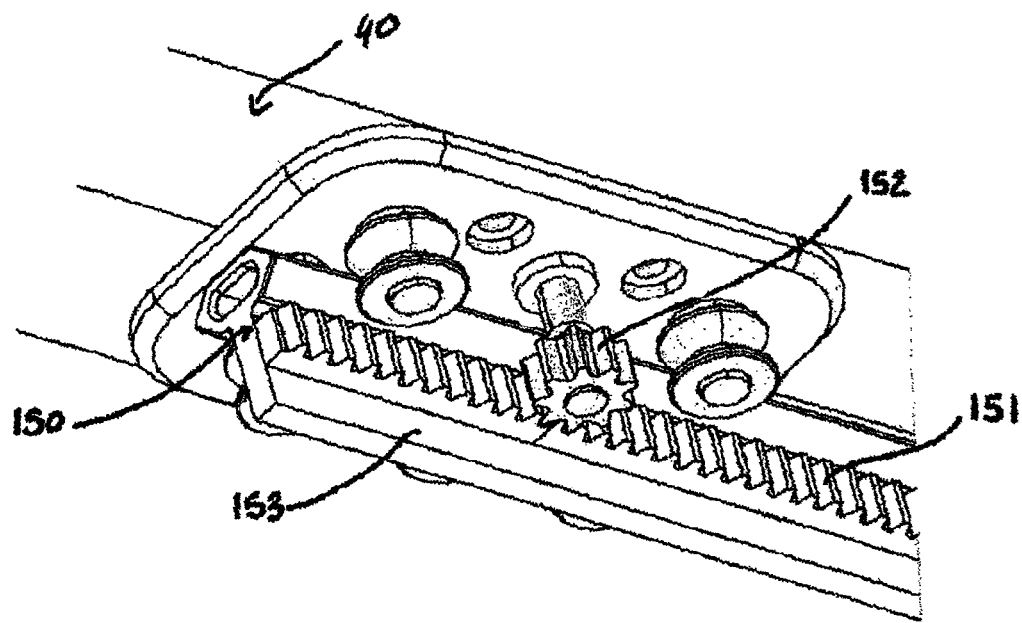
FIGS. 24 and 25 are schematic representations of a mechanical movement system suitable for the invention.
Figure 25:
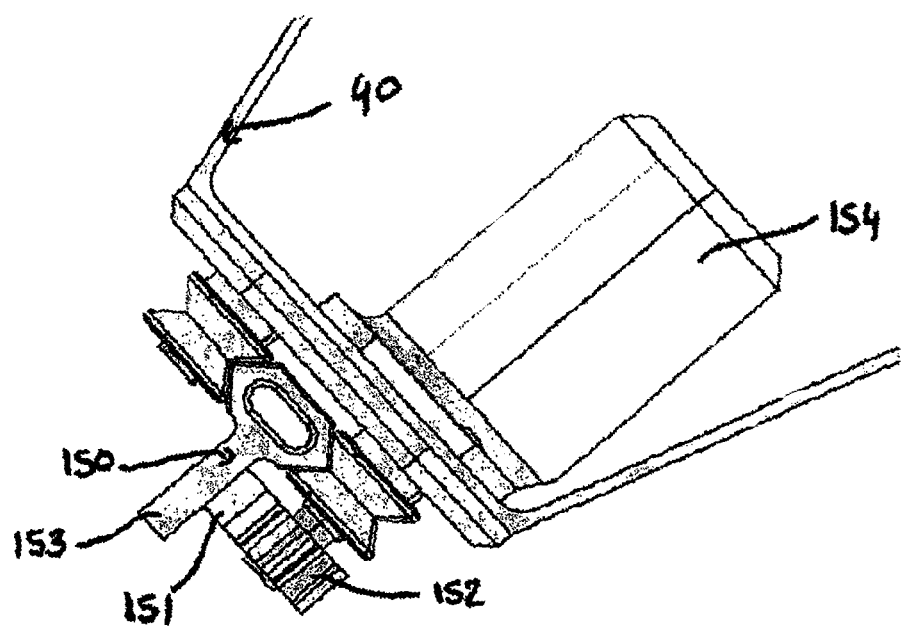

A second exemplary embodiment of such an operating system is shown for illustration purposes in FIGS. 24 and 25.

In this instance, it is possible notably to envisage the installation of one or more rails 150 comprising a crenelated longitudinal surface 151 forming a rack and capable of interacting with an operating means of the gear type 152 or worm type.

As shown, the crenelated surface 151 will preferably be provided on a lateral extension 153 of the rail 150, but it could optionally be provided on a surface belonging to the rail itself.

The operating means of the worm or gear type 152 can be connected to the shaft of an electric motor 154 and/or manual actuation means of the winder or handle type (not shown), preferably removable, the electric and manual operating means preferably being able to be disconnected from one another.

The operating means of the gear 152 type or worm type may be mounted without distinction on the fixed structure 41, 9 or on the movable structure 40 depending on whether the rail 150 is itself mounted on the movable structure 40 or on the fixed structure 41, 9. The positioning of the operating means depends on the necessary or desired length of movement and on the length of the rack 151 which may be provided only on a portion of the length of the rail 150.

Figure 20:
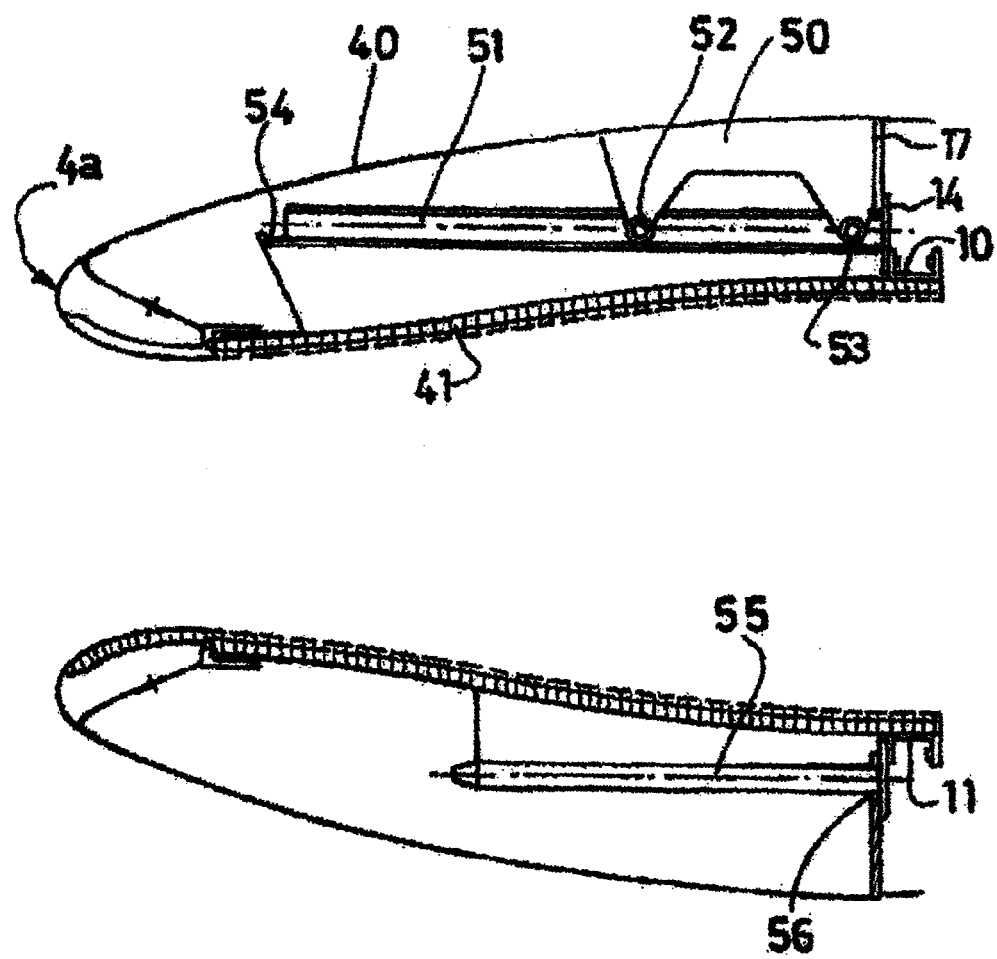
FIGS. 20 and 21 are schematic representations in longitudinal section of the guidance system of FIG. 19.
Figure 21:
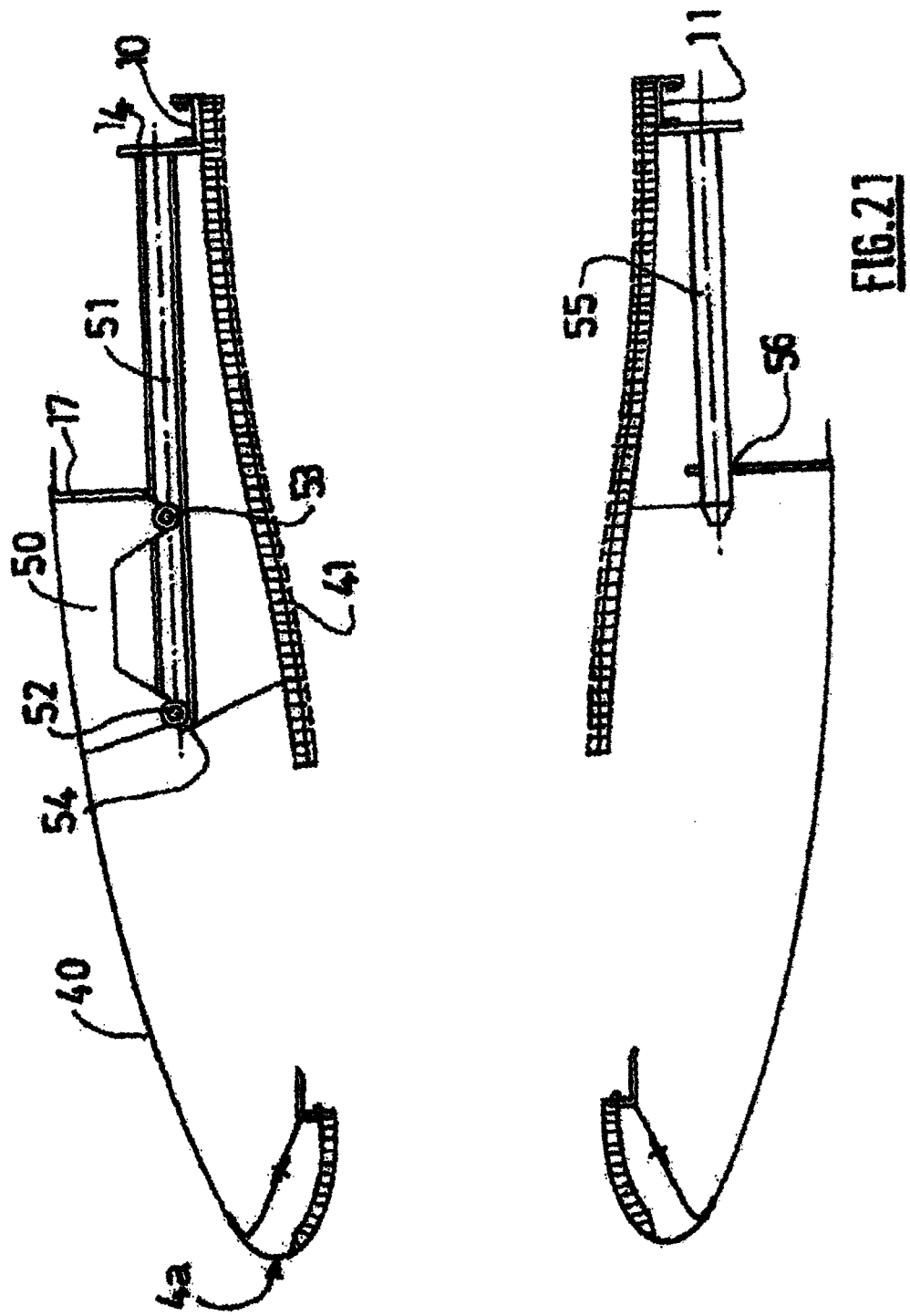

With reference, now, to the guidance of the movable portion 40 during a translation movement, a particular embodiment consists in using rails with roller wheels or rollers as mentioned previously for FIGS. 18 to 20. In such a guidance method, the alignment of the movable portion 40 with the fixed portion 41 becomes critical and an incorrect alignment of the guide rail may lead to jamming. This jamming is particularly present in the case, for example, of a rail moving in translation between two roller plates placed on either side of the rail and the operations of the movable cover 40 makes it necessary to have a perfect alignment between the two elements so as to prevent these jamming effects. This consequently requires spacing tolerances in manufacture that are as small as possible, particularly in the positioning of the plates and of the rail, and in the shape of the rail itself which must have a particularly smooth surface, any surface defect, roughness or other defects being likely to lead to this jamming.

An interesting improvement therefore consists in mounting the rollers on axles that are flexible and that will therefore be able to adapt to the defects of the rail, since they are unlikely to accommodate these defects by the elastic spreading of their axle.

In addition to alignment in operation, this allows a simplification in the manufacture of the rails, since the tolerance of the rollers to the surface defects has been greatly increased.

Figure 26:
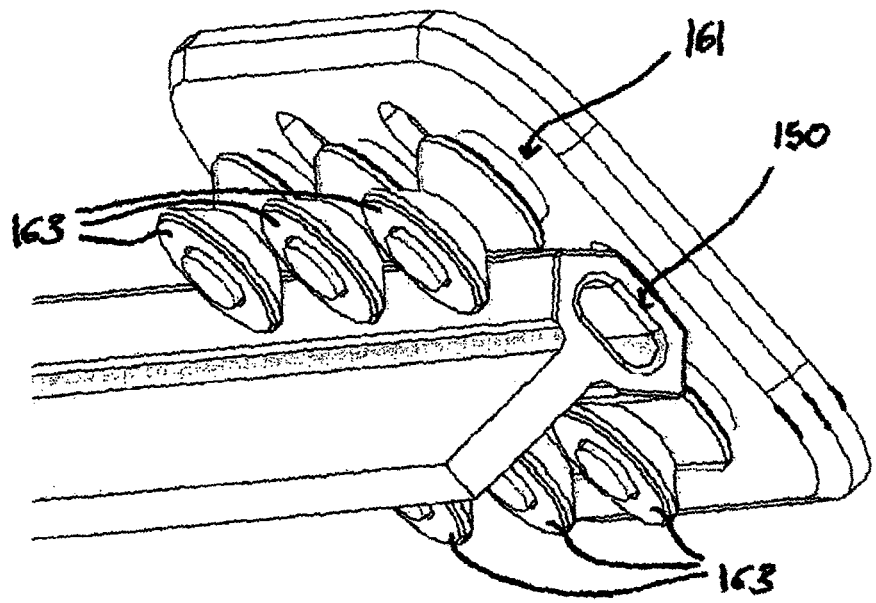
FIGS. 26 to 29 are representations of improvement that may be made to a rail/roller guidance system.

One exemplary embodiment is shown in FIG. 26. In this example, a rail 150 is mounted fixedly onto the fixed structure 41, 9 and guides two sets of three rollers 163 placed on either side of the rail 150 and mounted on plates 161.

Clearly, the present improvement is not limited to the plate shown in FIG. 26 and it is possible to envisage plates with two rollers 163 or else three rollers 163.

More precisely, in order to reduce any static redundancy between the rollers 163 and the rail 150, it is possible to envisage preferably a guidance of the rail 150 by two plates, a front plate and a rear plate, the front plate comprising two rollers while the rear plate will have three.

Each roller 163 is mounted on a flexible axle 164 of the PAULSTRA® type.

Furthermore, each plate 161 is also mounted on the movable structure 40 (if necessary on the fixed structure 41, 9) via flexible interface.

Figure 27:
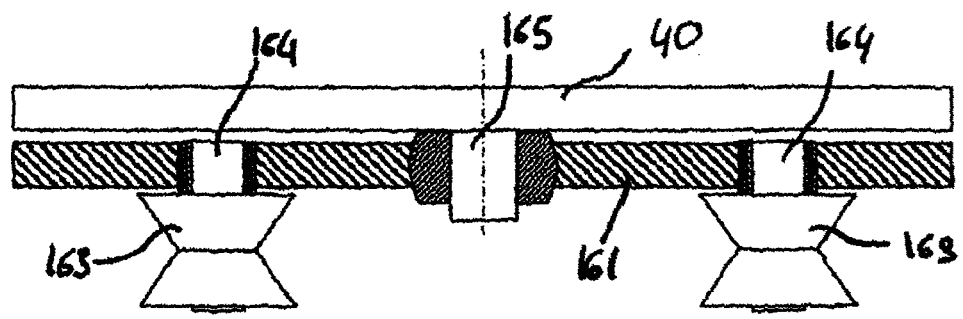

As shown in FIG. 27, the plate 161 is mounted on the movable structure 40 via a swivel-joint interface 165.

Figure 28:
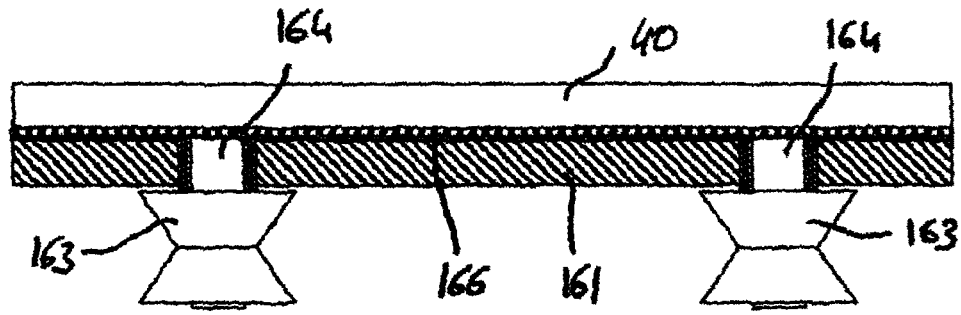

Alternatively or in addition, and as shown in FIG. 28, the plate 161 is mounted on the movable structure 40 via an elastic flexible interface 166 of the PAULSTRA® type similar to that used for the axles 164 of the rollers 163.

Also note that the figures show the use of a polygonal rail 150. Clearly other shapes of rail 150, notably cylindrical, are possible. Such a shape makes it possible also to dispense with certain alignment constraints by allowing a certain rotation of the plate 161 about the rail 150.

The plates 161, 162 and the rollers 163 may if necessary be associated with self-centering means.

Alternatively or additionally, the rollers 163 may also be mounted so as to allow a tolerance in their axial direction.

Figure 29:
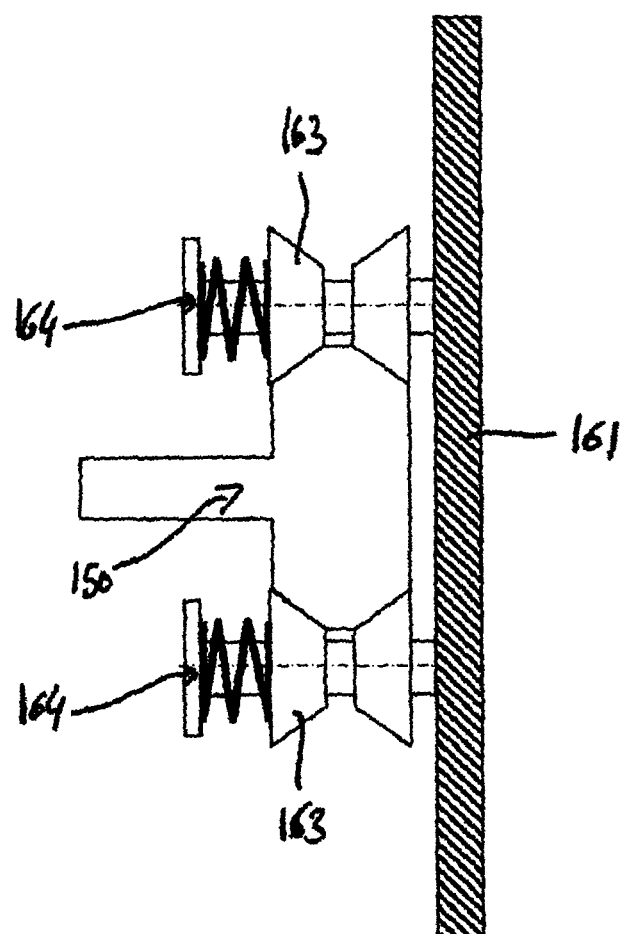

To do this, and as shown in FIG. 29, the axles 164 of the rollers 163 are extended and fitted with elastic return means, of the spring type 170 against which the rollers 163 are mounted.

Another addition relates to the aerodynamic continuity of the surfaces of the nacelle. As mentioned above when describing FIGS. 3 and 4, an important aspect of the design of a nacelle is the reduction of aerodynamic turbulence generated by junction faults (spreads and jumps, differences of level) between the various panels forming the nacelle.

In this instance, an important point is the junction between the end of the outer panel 40 terminating the air intake lip 4a and the inner panel 41.

Various joining methods have already been described for FIGS. 3 to 5.

However, these solutions only partly solve the problem since, in flight, the forces and vibrations are also partly sustained by the centering pins 21 or other attachment means and distributed over the periphery of the junction. To ensure a shearing strength at the interface of the centering pins 21, it is necessary for this interface to be in contact.

The two panels may also if necessary be operated in relative movements which disrupt the aerodynamic flow.

To ensure a very high level of aerodynamic efficiency, it is necessary to provide the purest possible continuity of line (clearance and travel (alignment)). Those skilled in the art know that they cannot produce two close interfaces in contact with one another for manufacturing reasons. Since the contact at the pins is preferable for reasons of structural design, the result is that it is necessary to transfer the clearance between the two interfaces in contact with the air that is harmful to the air-capture performance and therefore to the performance of the engine.

Figure 30:
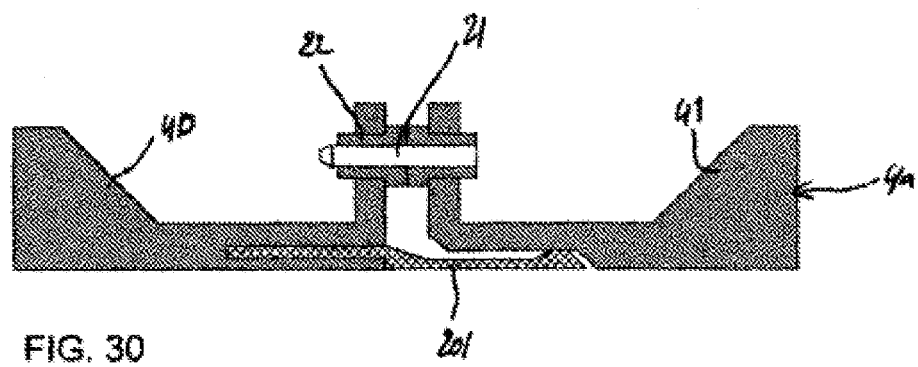
FIGS. 30 and 31 are representations of an improvement designed to improve the aerodynamic continuity of the assembly.

In order to further improve the aerodynamic continuity and to solve this problem, the outer panel is, at the end of the air intake lip 4a, terminated and extended by an elastic tongue 201 forming a sort of skirt and shown in FIG. 30, the tongue 201 being suitable, when the outer panel 40 is in the closed position, for overlapping the end of the inner panel 41 at the end of the air intake lip 4a.

Figure 31:
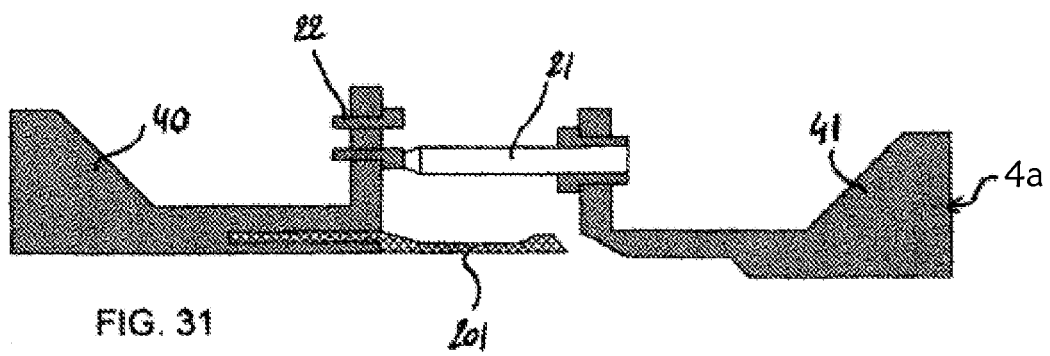

This improvement is shown in FIGS. 30 and 31.

The elastic tongue 201 is shown on the movable portion 40 at the end of the air intake lip. It cannot usually be incorporated into the fixed portion 41 because of the direction of the air flow, otherwise there would be a risk of air spillage.

The elastic tongue 201, covering the junction between the two panels 40 and 41, makes it possible to maintain a smooth inner surface while adapting to the relative movements and offsets between the panels 40 and 41.

The tongue 201 may be a flexible seal of the reinforced or unreinforced silicone type, or else a seal of the daisy type, for example made of metal with teflon contact. It is also possible to envisage a flexible and daisy seal.

The tongue 201 may be made as shown in FIGS. 30 and 31 with an end that is thicker than the rest of the tongue 201, in order to be able to be placed in prestress when it is mounted on the outer wall 40 so as to ensure a permanent contact irrespective of the differences due to the manufacturing tolerances and to the aerodynamic suction effects.

Consequently, this means that the shape of the end of the inner panel 41 designed to be covered by the tongue 201 is compatible with the prestress of the tongue 201. In this instance, the end of the inner panel 41 has a slight recess corresponding to the thickness of the end of the tongue 201.

It should be noted that preferably the centering pins 21 are designed so as to have a sufficient length to be placed in contact, engaged, before being placed in contact with the tongue 201.

Although the invention has been described with reference to particular exemplary embodiments, it is evident that it is in no way limited thereto and that it comprises all the technical equivalents of the means described and their combinations if the latter enter the scope of the invention.

Notably, it should be noted that the improvements presented, namely the methods of driving and guidance, the elastic tongue, are not limited to a nacelle having a particular movable cover but may be easily applied amongst others, on the one hand, to a nacelle having a movable cover also incorporating the outer wall of the middle section, and on the other hand, to other movable portions of the nacelle that are subjected to the same problems.

The invention claimed is:

1. A nacelle for a turbojet comprising:
   an air intake structure capable of channeling an air flow toward a fan of the turbofan,
   a middle structure surrounding said fan and to which the air intake structure is attached so as to provide an aerodynamic continuity, and
   a rear section aft of the middle structure, said rear section housing a thrust reverser system,
   the middle structure comprising a casing surrounding the fan and an outer structure,
   wherein the air intake structure comprises at least one inner panel attached to the middle structure by means of the casing and forming with the casing a fixed structure of the nacelle, and, at least one outer longitudinal panel attached in a removable manner to the fixed structure and incorporating an air intake lip, said at least one outer longitudinal panel being movable between an operating position in which the outer panel provides the aerodynamic continuity with the outer structure of the middle structure and the air intake lip provides the aerodynamic continuity with the inner panel of the air intake structure, and a maintenance position in which the outer panel is separated from the outer structure of the middle structure and the air intake lip is separated from the inner panel of the air intake structure, and wherein the middle structure comprises at least one laterally movable fan cover allowing external access to the nacelle.

2. The nacelle as claimed in claim 1, wherein the middle structure has, with the outer panel, an interface situated downstream of the air intake structure.

3. The nacelle as claimed in claim 1, wherein the lip and the outer panel of the air intake structure have an interface at which said lip and outer panel overlap partially when in the closed position.

4. The nacelle as claimed in claim 3, wherein a portion of an inner wall overlapping the lip incorporates means for deicing the bottom zone of said lip.

5. The nacelle as claimed in claim 1, wherein the outer panel of the air intake structure has a front frame capable of being attached to a matching partition of the air intake structure secured to a fixed portion of the nacelle by means of the inner panel.

6. The nacelle as claimed in claim 1, wherein the air intake structure comprises means for centering and positioning the outer panel.

7. The nacelle as claimed in claim 1, wherein the air intake structure comprises guidance means capable of allowing a substantially rectilinear movement of the outer panel toward the upstream of the nacelle so as to be able to open the outer panel.

8. The nacelle as claimed in claim 7, wherein the air intake structure comprises at least one abutment means of the outer panel capable of allowing a partial opening of the outer panel without requiring complete removal.

9. The nacelle as claimed in claim 7, wherein the guidance means comprise at least one rail system.

10. The nacelle as claimed in claim 9, wherein the at least one rail system comprises at least one rail capable of interacting with a corresponding slide or a runner.

11. The nacelle as claimed in claim 9, wherein the at least one rail system comprises at least one system of skids with rollers capable of interacting with a corresponding rail.

12. The nacelle as claimed in claim 11, wherein the rollers are mounted on flexible axles.

13. The nacelle as claimed in claim 11, wherein the rollers are mounted on at least one plate, said plate being attached in a flexible manner, via a swivel-joint connection or a flexible interface.

14. The nacelle as claimed in claim 9, wherein the at least one rail system comprises at least one channel-like rail capable of interacting with a corresponding slide system.

15. The nacelle as claimed in claim 7, wherein the guidance means comprise at least one longitudinal shaft capable of sliding through a corresponding opening.

16. The nacelle as claimed in claim 7, wherein the air intake structure comprises mechanical or manual means for moving the outer panel along the guidance means.

17. The nacelle as claimed in claim 1, wherein the inner panel of the air intake structure comprises an acoustic shroud.

18. The nacelle as claimed in claim 1, wherein the air intake structure comprises equipment for deicing the air intake structure.

19. The nacelle as claimed in claim 1, wherein the inner panel is, at the junction of the air intake lip, extended by a peripheral elastic tongue capable of covering said junction when the outer panel is in the closed position.

20. The nacelle as claimed in claim 1, wherein said at least one outer longitudinal panel is opened only after said laterally movable fan cover fitted to the middle structure is opened.

* * * * *